United States Patent [19]

Schnee et al.

[11] Patent Number: 4,770,622

[45] Date of Patent: Sep. 13, 1988

[54] APPARATUS FOR PRESSING, DIVIDING AND KNEADING PIECES OF DOUGH

[75] Inventors: Walter Schnee, VS-Villingen; Hans Sulzmann, Hufingen; Georg Fischer, VS-Villingen, all of Fed. Rep. of Germany

[73] Assignee: Fr. Winkler KG Spezialfabrik fur Backereimaschinen und Backofen, Villingen, Fed. Rep. of Germany

[21] Appl. No.: 884,593

[22] Filed: Jul. 11, 1986

[51] Int. Cl.⁴ .............................................. A01J 17/00
[52] U.S. Cl. .................................... 425/202; 425/238; 425/290; 425/296; 425/310; 425/364 R; 425/383
[58] Field of Search ................ 425/202, 206, 238–241, 425/289, 290, 292, 296, 308, 310, 363, 364 R, 383, 406

[56] References Cited

U.S. PATENT DOCUMENTS 835,207  11/1906  Houten .................................. 425/240

FOREIGN PATENT DOCUMENTS

3320114  12/1984  Fed. Rep. of Germany ...... 425/202
202547   9/1905   Fed. Rep. of Germany ...... 425/238
327260   1/1958   Switzerland ........................ 425/202
774505   5/1957   United Kingdom ................ 425/238
837666   6/1960   United Kingdom ................ 425/238

*Primary Examiner*—Bernard Nozick
*Attorney, Agent, or Firm*—Leonard Bloom

[57] ABSTRACT

Apparatus for pressing, dividing and kneading pieces of dough, the apparatus being adapted to be installed in a continuous and automatic dough processing plant, the pressure plate, dividing knives and dough holder ring being combined to form a unitary processing head which receives a revolving kneading movement while a kneading belt having kneading recesses remains stationary with respect to the processing head. The kneading belt conveys the undivided pieces of dough into the pressing, dividing and kneading zone and also conveys the discrete pieces of dough out of the same.

16 Claims, 7 Drawing Sheets

APPARATUS FOR PRESSING, DIVIDING AND KNEADING PIECES OF DOUGH

FIELD OF THE INVENTION

The present invention relates to apparatuses capable of pressing, dividing and kneading pieces of dough, and in particular, to such an apparatus capable of continuous operation, having a kneading belt and a processing head that is movable in a plane parallel to the kneading belt.

BACKGROUND OF THE INVENTION

The invention relates to apparatus according to the preamble to claim 1.

In known devices of this kind a piece of dough is placed on a dough carrier plate inside a dough holder ring, whereupon a vertically movable pressure plate so compresses the piece of dough to a constant thickness that it completely fills the dough holder ring. A likewise vertically movable star-shaped cutter then divides the pressed piece of dough into a number of equal-size discrete pieces. The dough carrier plate then receives a horizontally revolving movement so that the discrete pieces of dough are kneaded into round shape in the kneading chambers formed by the knife and the dough holder ring. On completion of this operation all the parts which have been lowered from above are lifted from the dough carrier plate and the kneaded discrete pieces of dough resting thereon are manually fed on for further processing.

This construction was hitherto an obstacle to incorporating a device of this kind in an automatically and continuously operating plant, since the kneaded discrete pieces of dough have to be taken away from the dough carrier plate and introduced into other conveying or processing means. This not only requires a complex handling operation but also a departure from the optimum time required for the dough processing, so that quality can be reduced.

SUMMARY OF THE INVENTION

Unlike the prior art, the kneading movement is not produced by a dough carrier plate receiving a revolving movement; instead the dough rests on an intermittently or continuously driven kneading belt and the revolving kneading movement is produced by a processing head in which a pressure plate, dividing knife and the dough holder ring are combined to form a unitary unit. The fact that this relatively heavy processing head instead of a lightweight dough carrier plate has to be set into a revolving movement might at first sight appear a disadvantage over the prior art but this slight disadvantage proves to be an important advantage since the apparatus can now without difficulty be installed in an automatically and continuously operating plant in conjunction with an intermittently or continuously driven kneading belt. The latter is normally driven intermittently and stops during the pressing, dividing and kneading operations. Then the processing head is returned to its initial position above the kneading belt, and the latter is advanced one step so that a new piece of dough comes to lie inside the dough holder ring then lowered on to the kneading belt.

For optimum utilization of space on the kneading belt the dough holder ring is advantageously substantially rectangular, its sides lying parallel and perpendicularly to the kneading belt.

In one advantageous embodiment the surface of the kneading belt is provided with profiled kneading recesses or rosettes cooperating with the kneading chambers or processing head.

Other features of the invention relate to the installation of the apparatus according to the invention in and its adaptation to a continuously and automatically operating plant by means of various auxiliary belts, such as storage and compensatory belts, spreader or sorting belts and additional conveyor belts. Installation of the apparatus in an automatic plant is also assisted by the fact that the individual belts can be vertically pivoted and the apparatus frame can be placed on castors so that it can readily, with minimum space requirement, be moved to a specific place in an existing plant or, when not in use, can be moved into a recess, for example, with optimum space saving with the belts swung up.

In another advantageous embodiment of the invention, in addition to the kneading movement, the processing head can additionally receive a rocking movement along or transversely of the kneading belt so that the kneaded discrete pieces of dough are additionally shaped in any other required way.

According to another advantageous feature of the apparatus, means may also be provided for automatically depositing the undivided pieces of dough on the kneading belt, and a proving zone.

According to another advantageous suggestion, the kneading belt may be in the form of kneading strips, the interconnected strips extending transversely of the directions of movement, or in the form of an endless elastic belt, kneading recesses or kneading rosettes being provided in each case on the belt. Finally, for complete automation, means may also advantageously be provided for flouring and oiling the pieces of dough and the kneading belt.

Exemplified embodiments of the invention will be explained in detail with reference to the drawings.

DESCRIPTION OF PREFERRED EMBODIMENTS

In all the Figures like or similar parts have like references.

Figure 1:
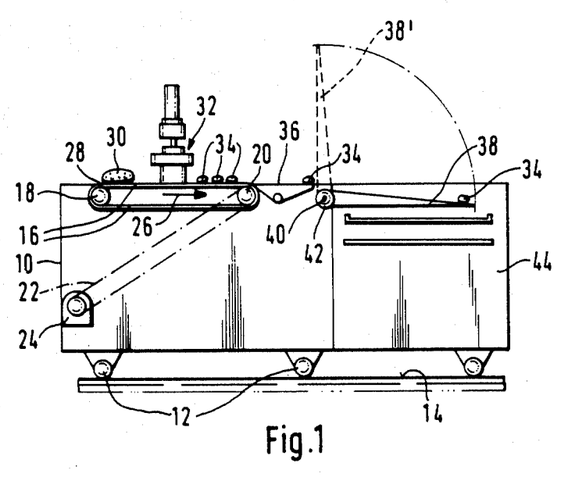
FIG. 1 is a diagrammatic side elevation of the apparatus according to the invention, the processing head drive means having been omitted for the sake of clarity.
Figure 2:
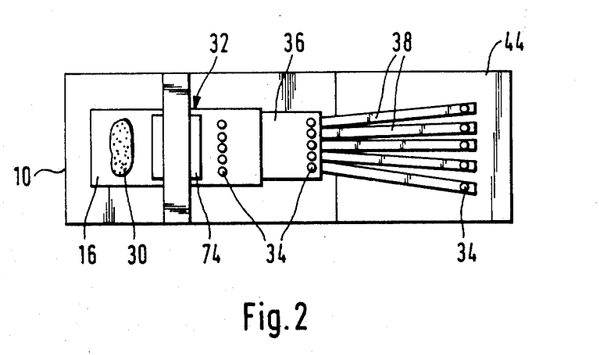
FIG. 2 is a plan view of parts of the apparatus shown in FIG. 1.

FIGS. 1 and 2 diagrammatically illustrate basic parts of one embodiment of the apparatus according to the invention, the processing head drive means and other details of the drive having been omitted for the sake of clarity, as are also all the supplementary devices described hereinbelow. The apparatus comprises a frame 10 in the form of a housing which rests on the floor 14 by means of castors 12 so as to be conveniently mobile thereon. An endless kneading belt 16 is disposed horizontally at the top of the frame 10 and is trained over two parallel rollers 18 and 20. Roller 20 is driven intermittently by an electric motor 24 by means of a driving belt 22.

An undivided piece of dough 30 is deposited on the kneading belt 16 near the beginning 28 thereof, the top run of the belt 16 moving in the direction of the arrow 26. In the manner to be described in detail hereinafter the piece of dough 30 is pressed, divided and kneaded to a round shape in a processing head having the general reference 32, and the kneaded discrete pieces of dough 34 are intermittently advanced in the direction of the arrow 26 after the completion of processing in the head 32 and after the latter has lifted off the surface of the kneading belt 16. When the kneaded pieces of dough 34 are in the position shown in FIG. 1 after renewed stoppage of the belt 16, another piece of dough 30 is undergoing processing in the head 32 while a third piece of dough 30 is approximately in the position shown in FIG. 1 at the start 28 of the belt 16.

The kneading belt 16 is followed by a storage and compensatory belt 36 which also has a horizontal surface for the further conveyance of the discrete pieces of dough 34, is in the form of an endless belt and trained over rollers and driven in manner not shown in detail. The distances between the individual rows of discrete pieces of dough 34 can be set to any value by a suitable drive for the belt 36.

The belt 36 is followed by a number of diverging spreader or sorting belts 38, which are known per se and which change the distance between the discrete pieces of dough 34 in the transverse direction. The belts 36 and 38 and their respective drives need not be explained in detail since they are known per se. What is important, however, is the feature that the belts 38 are pivotable about the axis 40 of their drive roller 42 vertically upwards into a position 38' shown in broken lines. In this position a part 44 of the housing can be removed from the frame and the device can be moved on the castors 12 to bring it to any other part of the works or a dough processing plant.

Figure 3:
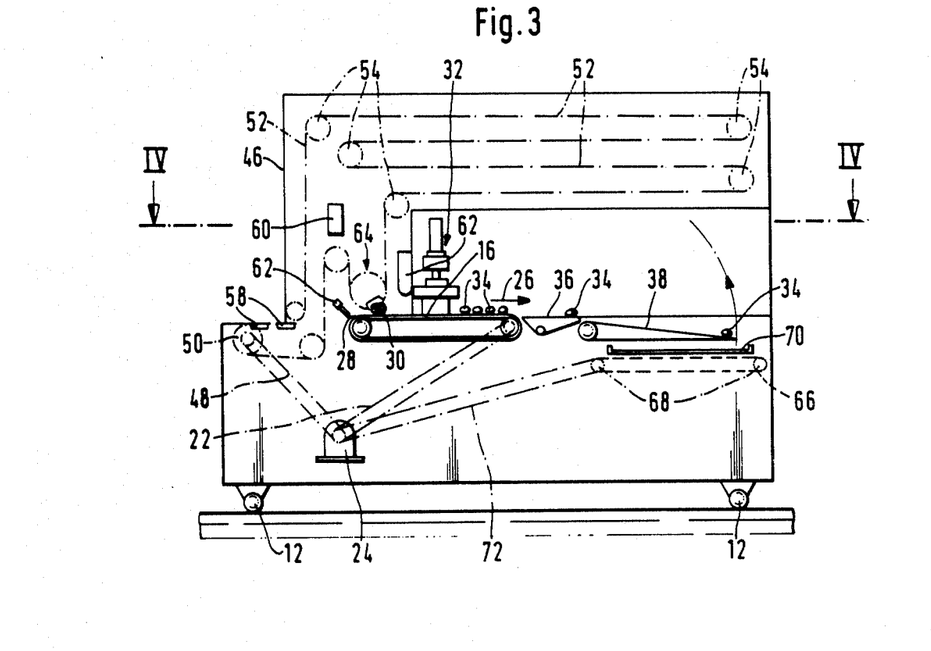
FIG. 3 is a side elevation, corresponding to FIG. 1, of another embodiment of the apparatus according to the invention preceded by a proving cabinet and followed by a deposition device.
Figure 4:
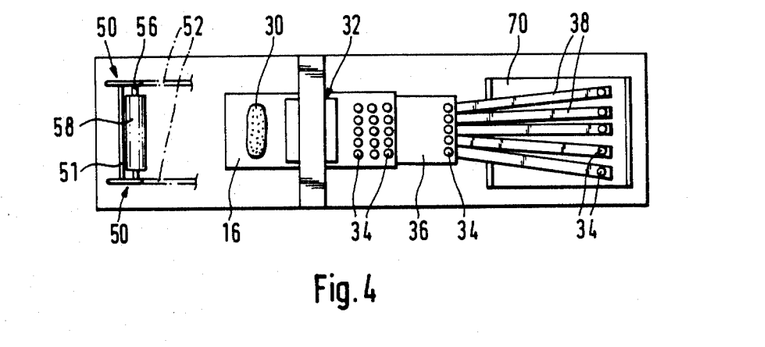
FIG. 4 is a section on the line IV—IV in FIG. 3.

In the embodiment shown in FIGS. 3 and 4, the apparatus shown in FIGS. 1 and 2 is surrounded by a tall housing 46 which is constructed in the form of a proving cabinet, which is again movable on castors 12.

By way of another driving belt 48 the electric motor 24 drives a sprocket wheel 50 driving a second sprocket wheel 50 via a shaft 51. An endless chain 52 of a chain conveyor runs over each of the two sprocket wheels 50, the chain conveyor being repeatedly deflected around sprocket wheels 54. Dough pans 58 are suspended rockably about transverse pivots 56 between the two chains, FIG. 3 showing three and FIG. 4 just one such pan. Pieces of dough 30 for processing are placed in the pans 58 in manner not shown in detail, either manually or, preferably, automatically, for example at the place where the pans 58 are shown in FIGS. 3 and 4, and taken along the chains 52 through the proving zone formed by the housing 46. At a place just before the delivery of the pieces of dough on to the kneading belt 16 an automatically operating flour spinkler 60 is disposed above the path of the dough pans 58 and a likewise automatically operating oiling station 62 is provided for example at the start 28 of the kneading belt 16 in order to oil the kneading recesses of the belt 16, which recesses will be explained hereinafter. In addition, a hot-air blower 62 can act from above on to the pieces of dough 30 on the kneading belt 16 to reduce their tackiness.

An automatic means of depositing the undivided pieces of dough 30 on to the kneading belt 16 is provided above the start 28 of the belt 16 and has the general reference 64. This device will be explained hereinafter.

Another horizontal conveyor belt 66 is disposed beneath the spreader or sorting belts 38 and rotates around rollers 68. In the embodiment illustrated, a proved material carrier 70 rests on the conveyor belt 66, the latter being driven suitably by the electric motor 24 via another driving belt 72. The discrete pieces of dough 34 fed via the spreader and sorting belts are thus deposited with appropriate spacing on the carrier 70.

The function of the processing head 32 will now be discussed in detail with reference to FIGS. 5–10. Head 32 comprises a rectangular dough holder ring 74, inside which a pressure plate 76 filling the ring is vertically slidable by way of struts 78 and actuating rods 80. Plate 76 has a rectangular network of vertical dividing knives 82 extending through it, said knives being vertically displaceable independently with respect to the ring 74 and the plate 76 via a common carrier plate 84, struts 86 and an actuating rod 88.

When an undivided piece of dough 30 on the surface of the kneading belt 16 arrives, on kneading recesses or rosettes 90, as will be explained hereinafter, beneath the processing head 32, which is lifted into the position shown in FIG. 5, the ring 74 is first lowered by actuating means (not shown) until it rests on the surface of the belt 16. Immediately thereafter the pressure plate 76 is also moved downwards into the position shown in FIG. 6 via the actuating rods 80 so that the piece of dough 30 is pressed into a uniformly flat shape 32' which uniformly fills the ring 74. The knives 82 are then moved downwards into the position shown in FIG. 7 via the actuating rod 88, until they rest on the surface of the belt 16. The piece of dough 32' is thus divided up into initially unkneaded substantially cubic discrete pieces of dough 34'. The plate 76 is then lifted slightly into the position shown in FIGS. 8 and 9, thus forming a row of kneading chambers 92 between the surface of the kneading support 16, the knives 82, the plate 76 and the ring 74, in which chambers the discrete pieces of dough 34' are to be kneaded into the final round shape 34 shown in FIG. 9. For kneading purposes, the entire processing head 32 is set into a revolving rocking movement parallel to the surface of the kneading belt 16 by drive means which will be explained hereinafter, so that the discrete pieces of dough 34' are kneaded into a round shape by co-operation with the kneading recesses 90 on the surface of the belt 16.

Figure 5:
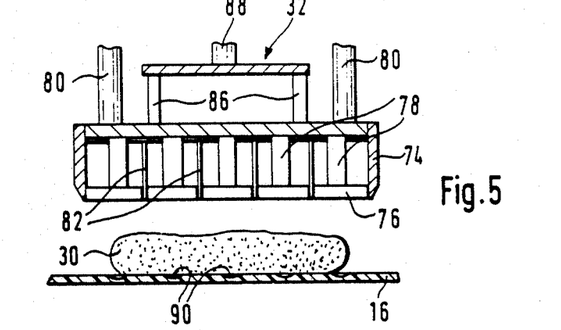
FIGS. 5 to 9 are vertical sections through the processing head and the kneading belt of the apparatus in various functional positions of these parts.
Figure 6:
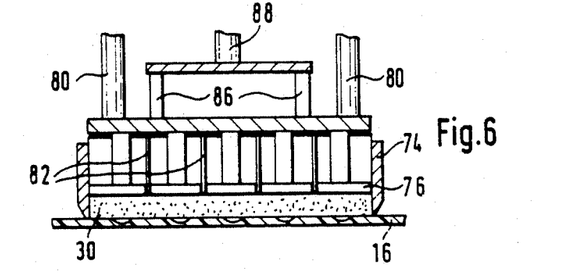
Figure 7:
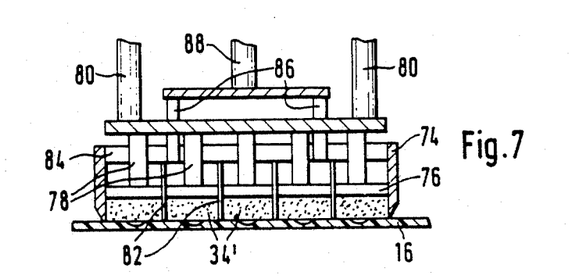
Figure 8:
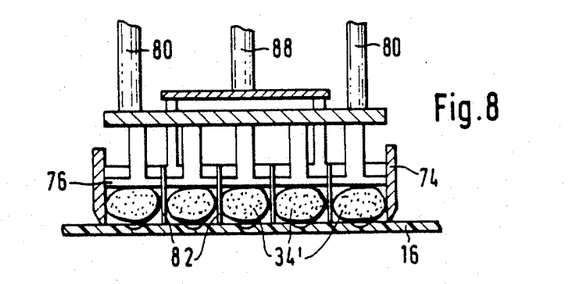
Figure 9:
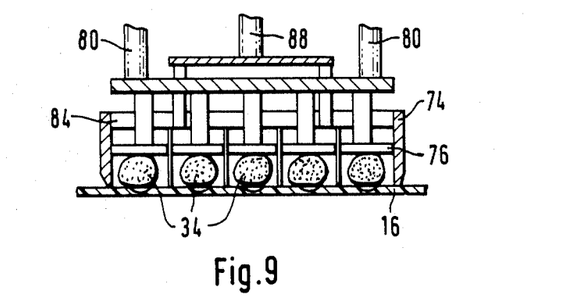
Figure 10:
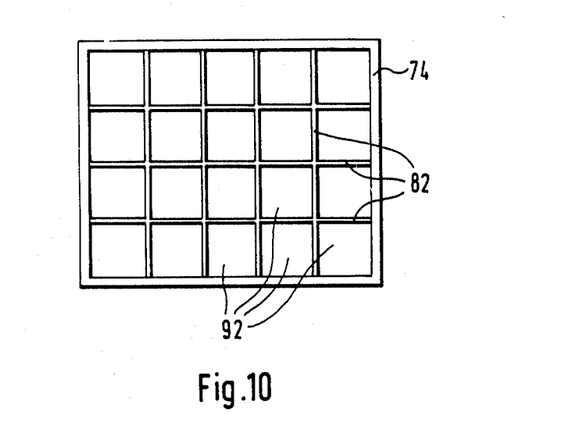
FIG. 10 is a bottom view of the processing head shown in FIGS. 5 to 9.

On completion of the kneading operation the entire head 32 is lifted from the belt 16 into the position shown in FIG. 5 and the belt 16 is advanced by one step until the discrete pieces of dough 34 kneaded into the round shape are outside the range of the head 32. At the same time, a new undivided piece of dough 30 comes to lie beneath the head 32.

In addition to the processing head 32 explained with reference to FIGS. 5 to 10, FIGS. 11 and 12 show drive means for moving said processing head. Head 32 is secured to a batten 94 extending transversely of the kneading belt 16, the batten in turn being connected via crankshafts 96 to rotating parts 98 of a rotary drive 100. On rotation of the crankshafts 96 the batten 94 and hence the processing head 32 are transmitted a revolving movement parallel to the kneading belt 16 so that the above described kneading movement can be carried out.

Figure 11:
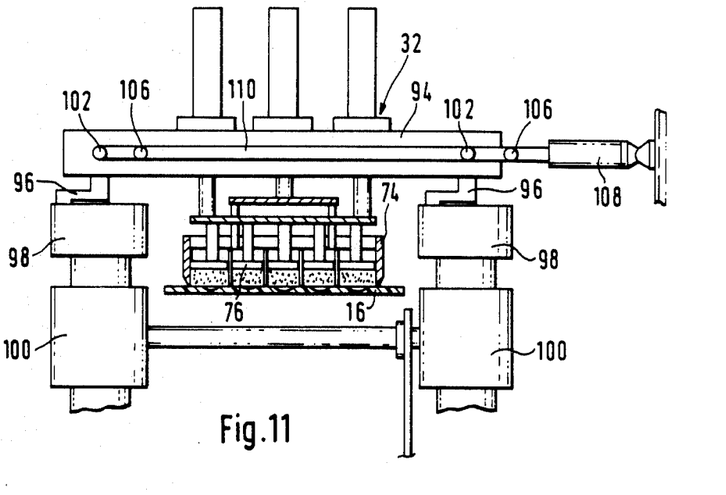
FIG. 11 is a partially sectioned side elevation corresponding to FIG. 1 showing the apparatus with the drive means for the processing head.
Figure 12:
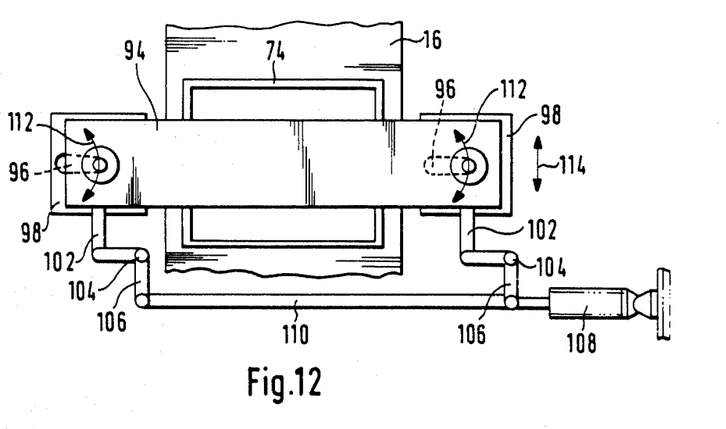
FIG. 12 is a plan view of the parts of the apparatus shown in FIG. 11.

The two drives 100 are in turn pivotally connected via struts 102 and by cranks 106 pivotable about pivots 104 to a rod 110 which is adapted to reciprocate by means of a working cylinder 108. On the reciprocating movement of the rod 110 the processing head 32 thus receives, in addition to the revolving kneading movement shown by the arrows 112, a limited reciprocating movement in the longitudinal direction of the kneading belt 16, for example in the direction of the double arrow 114. This additional longitudinal movement causes the discrete pieces of dough 34 not only to be kneaded into the round shape but also lengthened transversely of the kneading belt 16.

Figure 13:
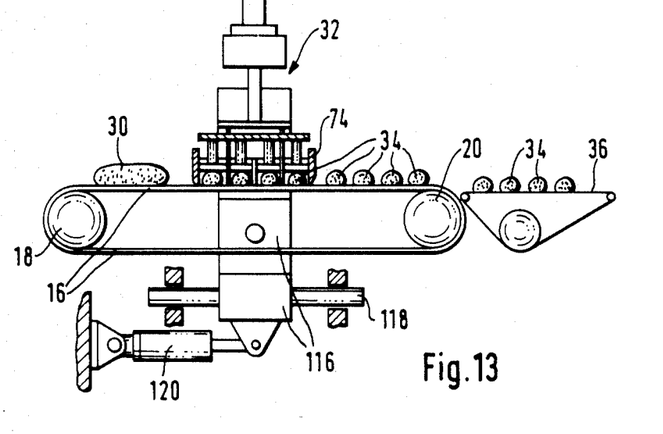
FIG. 13 is a partial side elevation of another embodiment of the apparatus according to the invention.
Figure 14:
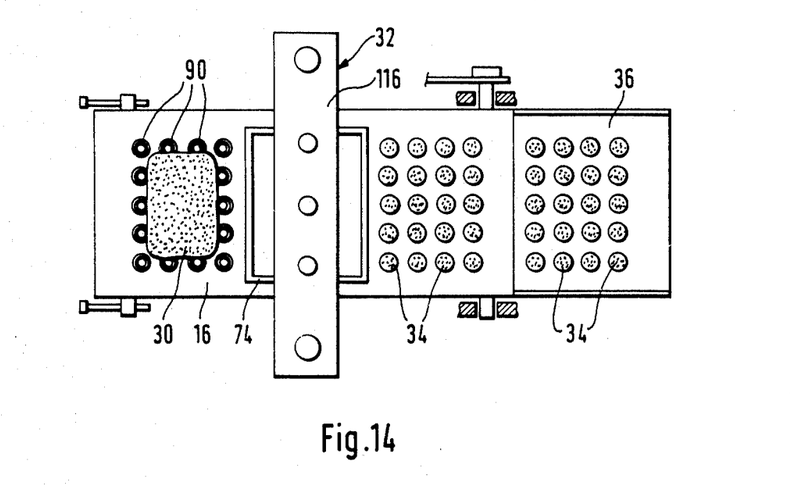
FIG. 14 is a plan view of the parts of the apparatus shown in FIG. 13.

In the embodiment shown in FIGS. 13 and 14, the kneading belt 16 is driven continuously in a manner not shown. To this end, the processing head 32 must be moved synchronously with the movement of the kneading belt 16 while the steps shown in FIGS. 5 to 9 are carried out. This synchronous movement is produced by a frame 116 enclosing the kneading belt 16 and slidable on a rod 118 extending longitudinally of the belt 16. The frame 116 is driven in synchronism with the movement of the belt 16 via a working cylinder 120 and on completion of the kneading operation it is returned to the initial position with the processing head 32 lifted. The working cylinder 120 is controlled fully automatically in a manner not shown.

Figure 15:
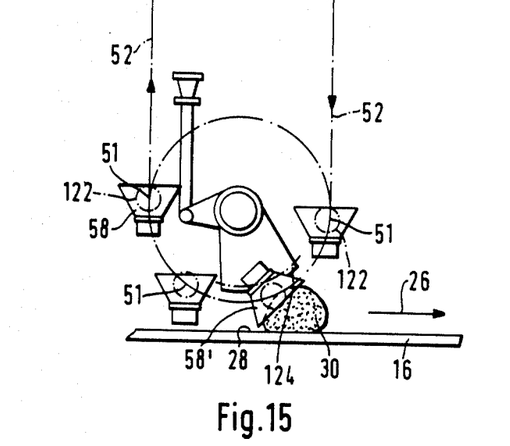
FIG. 15 is a partial side elevation of means for automatically depositing the pieces of dough on the kneading belt.

FIG. 15 shows in greater detail the means for automatically depositing the pieces of dough 30 on the belt 16, this device having been simply suggested in FIG. 3. The dough pans 58 suspended rockably about tranverse pivots 51 on the chains 52 shown diagrammatically have small gearwheels 122 on one side, the same running on a gear sector 124. Thus the dough pans 58 hanging in the upright position by gravity are tipped into a substantially upside-down position 58' near the start 28 of the belt 16 so that the undivided piece of dough 30 drops on to the kneading belt 16.

Figure 16:
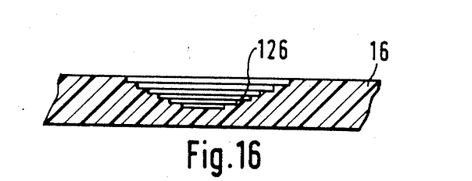
FIG. 16 is a vertical section through a detail of a continuous elastic kneading belt.

FIG. 16 shows a kneading rosette 126 on the top of an elastic endless kneading belt 16, said rosette co-operating with the kneading chambers 92.

Figure 17:
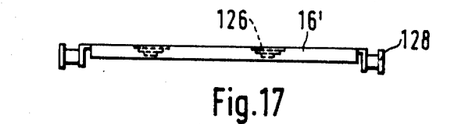
FIG. 17 is a cross-section through a kneading belt made up of strips.

In the kneading belt shown in FIG. 17, the individual transverse kneading strips 16' also have kneading rosettes 126 and are pivotally interconnected by lateral chains links 128.

Figure 18:
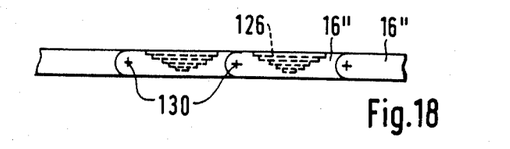
FIG. 18 is a side elevation of another embodiment of a kneading strip belt.

In the kneading belt shown in FIG. 18, the individual kneading strips 16" are again provided with kneading rosettes 126 and are pivotally interconnected by hinges 130.

We claim:

1. Apparatus for pressing, dividing and kneading pieces of dough, comprising a kneading support having a pressing, dividing and kneading zone which is disposed on a frame and in which the piece of dough for division, in a weight equivalent to many times the weight of the discrete pieces of dough, is pressed, by means of a pressure plate vertically slidable in a dough holder ring between a raised position, wherein the plate is spaced from the kneading support and a lowered position, wherein the plate at least fills the ring uniformly pressing the piece of dough, said ring being vertically slidable between a raised position, wherein the ring is spaced from the kneading support and a lowered position, wherein the ring rests on the kneading support surrounding the piece of dough, the uniformly pressed piece of dough is divided by cutting, by one or more dividing knives carried by a processing head and disposed through the plate, the knives being vertically slidable between a raised position, wherein the knives are spaced from the kneading support and a lowered position, wherein the knives rest on the kneading support for cutting the piece of dough into a plurality of substantially equal-size and hence equal-weight discrete pieces of dough, and wherein when the plate, knives and ring are all in their respective lowered positions, the discrete pieces of dough are kneaded in kneading chambers defined between the dividing knives, the dough holder ring, the pressure plate and the kneading support by rotation of the discrete pieces of dough, wherein the kneading support includes an intermittently or continuously rotating kneading belt having a profiled surface, which conveys the undivided piece of dough placed on the kneading belt into the pressing, dividing and kneading zone and conveys the discrete pieces of dough out of said zone, means for intermittently or continuously rotating the kneading belt, the processing head including the pressure plate, dividing knives, dough holder ring and an actuating means for vertically raising and lowering the plate, knives and ring, said head having a support, said support being adapted to receive a revolving rocking movement parallel to the kneading belt surface in order to knead the discrete pieces of dough, and means for imparting said revolving rocking movement to the processing head for kneading the discrete pieces of dough.

2. Apparatus according to claim 1, wherein the dough holder ring is substantially rectangular.

3. Apparatus according to claim 1, wherein profiled kneading recesses or kneading rosettes are provided in the surface of the kneading belt in an arrangement corresponding to the kneading chambers of the processing head.

4. Apparatus according to claim 1, wherein the kneading belt is followed by a storage and compensatory belt for advancing the kneaded discrete pieces of dough and for compensating for any unequal distances between the discrete pieces of dough.

5. Apparatus according to claim 1, wherein the frame is borne by castors.

6. Apparatus according to claim 1, where the processing head is adapted to receive a rocking longitudinal or transverse movement for additional shaping of the kneaded discrete pieces of dough.

7. Apparatus according to claim 1, further comprising a means for automatically depositing the undivided pieces of dough on the kneading belt.

8. Apparatus according to claim 1, wherein the apparatus is preceded by a proving zone through which dough pans are movable, each containing undivided pieces of dough, said dough pans being suspended rockably about transverse axes from parallel chains trained over a plurality of sprocket wheels and being adapted to be automatically emptied above the start of the kneading belt.

9. Apparatus according to claim 1, wherein the kneading belt is constructed from kneading strips, the interlinked strips which extend transversely of the direction of movement being formed with kneading recesses or kneading rosettes.

10. Apparatus according to claim 1, wherein the kneading belt is in the form of an endless elastic belt with kneading recesses or kneading rosettes.

11. Apparatus according to claim 1, further comprising: the kneading belt having a portion, wherein the piece of dough for division is delivered, and a flour sprinkler is positioned before that portion of the kneading belt wherein the piece of dough for division is delivered, for applying flour to that surface of the undivided pieces of dough which is to be placed on the kneading belt.

12. Apparatus according to claim 1, further comprising: the kneading belt having a portion thereof wherein the piece of dough for division is delivered, an oiling station positioned over the portion of the kneading belt wherein the piece of dough for division is delivered, for oiling the kneading recesses or rosettes of the kneading belt before receiving the discrete pieces of dough.

13. Apparatus for pressing, dividing and kneading pieces of dough, comprising a kneading support having a pressing, dividing and kneading zone which is disposed on a frame and in which the piece of dough for division, in a weight equivalent to many times the weight of the discrete pieces of dough, is pressed, by means of a pressure plate vertically slidable in a dough holder ring between a raised position, wherein the plate is spaced from the kneading support and a lowered position, wherein the plate at least fills the ring uniformly pressing the piece of dough, said ring being vertically slidable between a raised position, wherein the ring is spaced from the kneading support and a lowered position, wherein the ring rests on the kneading support surrounding the piece of dough, the uniformly pressed piece of dough is divided by cutting, by one or more dividing knives carried by a processing head and disposed through the plate, the knives being vertically slidable between a raised position, wherein the knives are spaced from the kneading support and a lowered position, wherein the knives rest on the kneading support for cutting the piece of dough into a plurality of substantially equal-size and hence equal-weight discrete pieces of dough, and wherein when the plate, knives and ring are all in their respective lowered positions, the discrete pieces of dough are kneaded in kneading chambers defined between the dividing knives, the dough holder ring, the pressure plate and the kneading support by rotation of the discrete pieces of dough, wherein the kneading support includes an intermittently or continuously rotating kneading belt having a profiled surface, which conveys the unidivided piece of dough placed on the kneading belt into the pressing, dividing and kneading zone and conveys the discrete pieces of dough out of said zone, means for intermittently or continuously rotating the kneading belt, the processing head including pressure plate, dividing knives, dough holder ring and an actuating means for vertically raising and lowering the plate, knives, and ring, said head having a support, said support being adapted to receive a revolving rocking movement parallel to the kneading belt surface in order to knead the discrete pieces of dough, and means for imparting said revolving rocking movement to the processing head for kneading the discrete pieces of dough;

wherein the kneading belt or the storage and compensatory belt are followed by a plurality of spreader or sorting belts by means of which the discrete pieces of dough are adapted to be deposited on another conveyor belt or, in conjunction with a conveyor belt, on the proved material carriers disposed on the another conveyor belt, the transverse and longitudinal positions of the deposited discrete pieces of dough being adjustable by means of the lateral distance between the spreader or sorting belts and/or their rate of advance.

14. Apparatus for pressing, dividing and kneading pieces of dough, comprising a kneading support having a pressing, dividing and kneading zone which is disposed on a frame and in which the piece of dough for division, in a weight equivalent to many times the weight of the discrete pieces of dough, is pressed, by means of a pressure plate vertically slidable in a dough holder ring between a raised position, wherein the plate is spaced from the kneading support and a lowered position, wherein the plate at least fills the ring uniformly pressing the piece of dough, said ring being vertically slidable between a raised position, wherein the ring is spaced from the kneading support and a lowered position, wherein the ring rests on the kneading support surrounding the piece of dough, the uniformly pressed piece of dough is divided by cutting, by one or more dividing knives carried by a processing head and disposed through the plate, the knives being vertically slidable between a raised position, wherein the knives are spaced from the kneading support and a lowered position, wherein the knives rest on the kneading support for cutting the piece of dough into a plurality of substantially equal-size and hence equal-weight discrete pieces of dough, and wherein when the plate, knives and ring are all in their respective lowered positions, the discrete pieces of dough are kneaded in kneading chambers defined between the dividing knives, the dough holder ring, the pressure plate and the kneading support by rotation of the discrete pieces of dough, wherein the kneading support includes an intermittently or continuously rotating kneading belt having a profiled surface, which conveys the unidivided piece of dough placed on the kneading belt into the pressing, dividing and kneading zone and conveys the discrete pieces of dough out of said zone, means for intermittently or continuously rotating the kneading belt, the processing head including pressure plate, dividing knives, dough holder ring and an actuating means for vertically raising and lowering the plate, knives and ring, said head having a support, said support being adapted to receive a revolving rocking movement parallel to the kneading belt surface in order to knead the discrete pieces of dough, and means for imparting said revolving rocking movement to the processing head for kneading the discrete pieces of dough;

wherein the apparatus further includes spreader or sorting belts, each of said belts being movably disposed on a drive roller which is pivotably secured to the frame for vertical pivotal movement and at least one conveyor belt, each conveyor belt being movably disposed on a drive roller which is pivotably secured to the frame for vertical pivotal movement.

15. Apparatus for pressing, dividing and kneading pieces of dough, comprising a kneading support having a pressing, dividing and kneading zone which is disposed on a frame and in which the piece of dough for division, in a weight equivalent to many times the weight of the discrete pieces of dough, is pressed, by means of a pressure plate vertically slidable in a dough holder ring between a raised position, wherein the plate is spaced from the kneading support and a lowered position, wherein the plate at least fills the ring uniformly pressing the piece of dough, said ring being vertically slidable between a raised position, wherein the ring is spaced from the kneading support and a lowered position, wherein the ring rests on the kneading support surrounding the piece of dough, the uniformly pressed piece of dough is divided by cutting, by one or more dividing knives carried by a processing head and disposed through the plate, the knives being vertically slidable between a raised position, wherein the knives are spaced from the kneading support and a lowered position, wherein the knives rest on the kneading support for cutting the piece of dough into a plurality of substantially equal-size and hence equal-weight discrete pieces of dough, and wherein when the plate, knives, and ring are all in their respective lowered positions, the discrete pieces of dough are kneaded in kneading chambers defined between the dividing knives, the dough holder ring, the pressure plate and the kneading support by rotation of the discrete pieces of dough, wherein the kneading support includes an intermittently or continuously rotating kneading belt having a profiled surface, which conveys the undivided piece of dough laced on the kneading belt into the pressing, dividing and kneading zone and conveys the discrete pieces of dough out of said zone, means for intermittently or continuously rotating the kneading belt, the processing head including pressure plate, dividing knives, dough holder ring and an actuating means for vertically raising and lowering the plate, knives and ring, said head having a support, said support being adapted to receive a revolving rocking movement parallel to the kneading belt surface in order to knead the discrete pieces of dough, and means for imparting said revolving rocking movement to the processing head for kneading the discrete pieces of dough; and wherein during the pressing, dividing and kneading operation, the processing head is adapted to receive a movement in synchronism with the continuously driven kneading belt, and then a movement to lift it away from the kneading belt and then a return movement to the initial position.

16. Apparatus for pressing, dividing and kneading pieces of dough, comprising a kneading support having a pressing, dividing and kneading zone which is disposed on a frame and in which the piece of dough for division, in a weight equivalent to many times the weight of the discrete pieces of dough, is pressed, by means of a pressure plate vertically slidable in a dough holder ring between a raised position, wherein the plate is spaced from the kneading support and a lowered position, wherein the plate at least fills the ring uniformly pressing the piece of dough, said ring being vertically slidable between a raised position, wherein the ring is spaced from the kneading support and a lowered position, wherein the ring rests on the kneading support surrounding the piece of dough, the uniformly pressed piece of dough is divided by cutting, by one or more dividing knives carried by a processing head disposed through the plate, the knives being vertically slidable between a raised position, wherein the knives are spaced from the kneading support and a lowered position, wherein the knives rest on the kneading support cutting the piece of dough into a plurality of substantially equal-size and hence equal-weight discrete pieces of dough, and wherein when the plate, knives and ring are all in their respective lowered positions, the discrete pieces of dough are kneaded in kneading chambers defined between the dividing knives, the dough holder ring, the pressure plate and the kneading support by rotation of the discrete pieces of dough, wherein the kneading support includes an intermittently or continuously rotating kneading belt having a profiled surface, which conveys the undivided piece of dough placed on the kneading belt into the pressing, dividing and kneading zone and conveys the discrete pieces of dough out of said zone, means for intermittently or continuously rotating the kneading belt, the processing head including pressure plate, dividing knives, dough holder ring and an actuating means for vertically raising and lowering the plate, knives and ring, said head having a support, said support being adapted to receive a revolving rocking movement parallel to the kneading belt surface in order to knead the discrete pieces of dough, and means for imparting said revolving rocking movement to the processing head for kneading the discrete pieces of dough;

wherein the means for imparting the said revolving rocking movement to the processing head includes a batten disposed above and extending substantially transversely to the kneading belt, the batten having the processing head secured thereto for revolving rocking movement therewith, a drive motor having a crankshaft, the crankshaft having one end eccentrically secured to the motor and eccentrically driven thereby for eccentric rotational movement in response to the motor, and the crankshaft having an opposite end secured to the batten, wherein the eccentric rotational movement of the first end is translated to revolving rocking movement at the opposite end, thereby imparting the revolving rocking movement to the processing head for kneading the discrete pieces of dough.

* * * * *